US011503163B2

(12) United States Patent
Liu et al.

(10) Patent No.: US 11,503,163 B2
(45) Date of Patent: Nov. 15, 2022

(54) METHODS AND APPARATUS FOR ENHANCING GROUP SOUND REACTIONS DURING A NETWORKED CONFERENCE

(71) Applicant: Zoom Video Communications, Inc., San Jose, CA (US)

(72) Inventors: Qiyong Liu, Shenzhen (CN); Oded Gal, Palo Alto, CA (US); Lin Han, Los Altos, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/039,870

(22) Filed: Sep. 30, 2020

(65) Prior Publication Data

US 2022/0103690 A1  Mar. 31, 2022

(51) Int. Cl.
*H04M 3/56* (2006.01)
*H04L 65/403* (2022.01)

(52) U.S. Cl.
CPC .......... *H04M 3/568* (2013.01); *H04L 65/403* (2013.01)

(58) Field of Classification Search
USPC .................................................. 379/202.01
See application file for complete search history.

(56) References Cited

U.S. PATENT DOCUMENTS

| 8,628,424 B1* | 1/2014 | Kern | A63F 13/798 |
| | | | 463/31 |
| 2007/0072602 A1 | 3/2007 | Lemmey et al. | |
| 2012/0326866 A1* | 12/2012 | Lemmey | H04N 21/422 |
| | | | 340/540 |
| 2016/0065897 A1* | 3/2016 | Gottlieb | H04L 65/403 |
| | | | 348/14.08 |

OTHER PUBLICATIONS

International Search Report in PCT Application No. PCT/US2021/052261, dated Nov. 24, 2021.

* cited by examiner

*Primary Examiner* — Amal S Zenati
(74) *Attorney, Agent, or Firm* — Cognition IP, P.C.; Edward Steakley; Rajesh Fotedar

(57) ABSTRACT

Enhancing group sound during a networked conference is disclosed. In an embodiment, a method includes generating an audio signal at a user equipment (UE), detecting a group sound in the audio signal, generating a group sound indicator that identifies the detected group sound, and transmitting the group sound indicator to a network server. The method also includes receiving, from the network server, a control signal that identifies a selected group sound, and reproducing, at the UE, the selected group sound identified by the control signal.

14 Claims, 7 Drawing Sheets

NETWORKED CONFERENCE WITH GROUP SOUND ENHANCEMENT

NETWORKED CONFERENCE WITH GROUP SOUND ENHANCEMENT

Group Sound Detection Indicator — 602

| GS DETECTION INDICATOR (604) | DETECTED GROUP SOUND (606) |
|---|---|
| xxxxxxx1 | APPLAUSE |
| xxxxxx1x | LAUGHTER |
| xxxxx1xx | CHEERS |
| xxxx1xxx | CUSTOM |

GROUP SOUND DETECTION INDICATOR

Group Sound Control Indicator — 608

| GS CONTROL INDICATOR (610) | REPRODUCIBLE GROUP SOUND (612) |
|---|---|
| xxxxxxx1 | LIGHT APPLAUSE |
| xxxxxx1x | LOUD APPLAUSE |
| xxxxx1xx | LIGHT LAUGHTER |
| xxxx1xxx | LOUD LAUGHTER |
| xxx1xxxx | LIGHT CHEERS |
| xx1xxxxx | LOUD CHEERS |
| x1xxxxxx | CUSTOM |

GROUP SOUND CONTROL INDICATOR

FIG. 6

METHOD FOR OPERATING UE TO PROVIDE GROUP SOUND ENHANCEMENT

METHOD FOR OPERATING A SERVER TO PROVIDE GROUP SOUND ENHANCEMENT

METHODS AND APPARATUS FOR ENHANCING GROUP SOUND REACTIONS DURING A NETWORKED CONFERENCE

FIELD

The exemplary embodiments of the present invention relate to the field of network communication. More specifically, the exemplary embodiments of the present invention relate to enhancing group sound reactions during a network conference.

BACKGROUND

With the increasing popularity of digital electronics and network communications, real-time interactive networked conferences have become more popular. For example, video conferencing applications allow people to communicate with each other from remote locations and exchange audio and video content in real time.

Audio sharing during a networked conference is an important feature. A meeting attendee, for example, can receive and transmit audio information with other attendees. One sound-related issue that occurs during team meetings or large events is when users respond with certain reactions that in real life produce a sound. These sounds include clapping, cheering, and happy birthday greetings and can be referred to as group sounds (GS). Unfortunately, conventional conference systems allow only a few participants to be heard by others in the conference when group sounds occur. When participants start clapping, for example, the sound from only a few users clapping can be heard by other users in the meeting. This minimizes the group experience during a large network conference.

SUMMARY

In various embodiments, a group sound enhancement system (GSES) is disclosed that provides enhanced group sounds during a networked conference. To support a richer experience in large events, embodiments of the GSES analyze the microphone input at each attendee's client, and report to the server if a specific audio event (e.g., group sound), such as cheers or clapping has been detected. During any certain time interval, if the number of attendees that are producing the detected sound exceeds a pre-defined threshold, each client is triggered to reproduce (or play) a corresponding sound reaction in the meeting that simulates the sounds of multiple users making the detected group sound. All attendees including the presenter and audience will hear the reproduced group sound. In an embodiment, the threshold number is based on a combination of detected sounds and reactions initiated by different meetings participants.

In an embodiment, a method is provided for group sound enhancement that includes generating an audio signal at a user equipment (UE), detecting a group sound in the audio signal, generating a group sound indicator that identifies the detected group sound, and transmitting the group sound indicator to a network server. The method also includes receiving, from the network server, a control signal that identifies a selected group sound, and reproducing, at the UE, the selected group sound identified by the control signal.

In an embodiment, apparatus is provided for group sound enhancement in a network conference. The apparatus comprises a detector that detects a group sound in an audio signal at a UE. The detector generates a group sound indicator that identifies the group sound. The apparatus also comprises a transceiver that transmits the group sound indicator to a network server and receives a control signal from the network server. The apparatus also comprises a processor that reproduces a selected group sound that is identified by the control signal.

In an embodiment, a non-transitory computer readable medium is provided on which are stored program instructions that, when executed by a processor, cause the processor to perform operations of: generating an audio signal at a user equipment (UE); detecting a group sound in the audio signal; generating a group sound indicator that identifies the detected group sound; transmitting the group sound indicator to a network server; receiving, from the network server, a control signal that identifies a selected group sound; and reproducing, at the UE, the selected group sound identified by the control signal.

In an embodiment, a method is provided for operating a server to provide group sound enhancements in a network conference. The method comprises receiving one or more group sound indicators from one or more UE, determining when the number of UE detecting a selected group sound within a selected time interval exceeds a threshold value, and when the threshold is exceeded, transmitting a group sound control indicator to the UE of the network conference. The group sound control indicator indicates a group sound to be reproduced at each UE.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only.

FIG. 6 shows an exemplary embodiments of the indicators GSDI and GSCI for use with embodiments of a group sound enhancement system.

DETAILED DESCRIPTION

Figure 1:
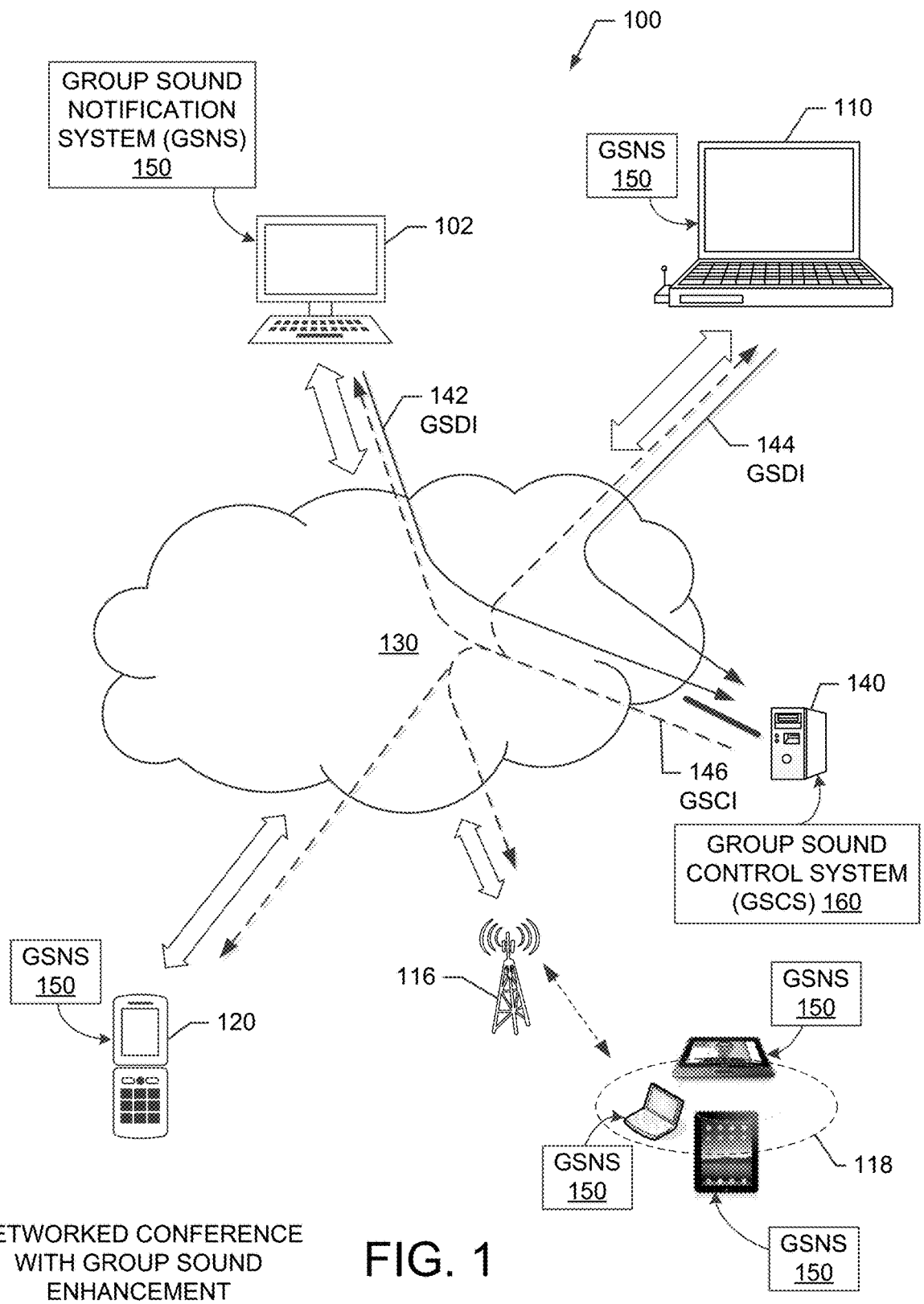
FIG. 1 shows a diagram illustrating a communication network that provides a networked conference that includes embodiments of a group sound enhancement system.

Embodiments of the present invention disclose methods and apparatus for providing enhanced group sound processing during online real-time interactive networked conference meetings.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a diagram illustrating a communication network 100 that provides a networked conference that includes embodiments of a group sound enhancement system. The communication network 100 comprises a server computer 140 coupled to a network 130, which is also coupled to client computers 102, 110, 118, and 120 as attendee's systems or devices. Server 140, in one example, is coupled to a group of wireless or portable devices 118 via a base station 116. In one example, server 140 may represent an instance among a large number of instances of application servers in a data center, cloud computing environment, or any other mass computing environment. In an embodiment, the network 130 comprises a wired network, wireless network, or any combination of wired and wireless networks. There also may be included thousands or millions of client computers. It should be noted that the underlying concepts of the exemplary embodiments of the present invention would not change if one or more blocks (or systems) were added to or removed from the communication network 100.

In an embodiment, server computer 140 hosts a networked conference meeting and transmits and receives video and audio data to and from each of the client computers 102, 110, 118, and 120. Each of the client computers 102, 110, 118, and 120 includes a computing device having a central processing unit (CPU), graphics processing unit (GPU), one or more buses, memory organized as volatile and/or nonvolatile storage, one or more data input devices, I/O interfaces and output devices such as loudspeakers or a LINE-OUT jack and associated drivers. Each of the client computers 102, 110, 118, and 120 may include an integrated or separate display unit such as a computer screen, TV screen or other display. Client computers 102, 110, 118, and 120 may comprise any of mobile or stationary computers including desktop computers, laptops, netbooks, ultrabooks, tablet computers, smartphones, et cetera. It should be noted that GPU and CPU each manage separate hardware memory spaces. For example, CPU memory may be used primarily for storing program instructions and data associated with application programs, whereas GPU memory may have a high-speed bus connection to the GPU and may be directly mapped to row/column drivers or driver circuits associated with a liquid crystal display (LCD) that serves as the display. In exemplary embodiments, the network 130 is a wired network, wireless network, or any combination thereof. In one embodiment, the network 130 is the Internet.

Each of the client computers 102, 110, 118, and 120 hosts an application that allows each of the client computers 102, 110, 118, and 120 to communicate with the server computer 140. In an embodiment, the server 140 maintains a list of accounts, each associated with one of the client computers 102, 110, 118, 120 and/or one or more users of the client computers.

In one embodiment, each of the client computers 102, 110, 118, and 120 can be used by an attendee of a networked conference session. Client computers 102, 110, 118, and 120 can be simultaneously a presenter and recipient attendee of a networked conference session.

Group Sound Enhancements

With the recent growth of networked meetings, users have started to utilize these meetings for applications beyond business meetings. For example, networked audio/video meetings are now being used for large personal gatherings, such as informal club meetings or parties, such as birthday parties. During a large event, users respond with group sounds, such as clapping, cheering, laughter, or other real life sounds. It is desirable that meeting participants experience these group sounds as emanating from a large number of meeting participants to provide a more realistic meeting experience.

In an embodiment, the group sound enhancement system operates to provide a more realistic group sound experience in a network conference. As illustrated in FIG. 1, the client computers 102, 110, 118, 120 include an embodiment of a group sound notification system (GSNS) 150 and the server computer 140 includes an embodiment of a group sound control system (GSCS) 160. The notification system 150 and control system 160 work together to provide enhanced group sounds during a network conference.

During operation, the GSNS 150 at each of the computers 102, 110, 118, 120 detects when specific types of sounds, such as clapping or cheering, occur at each computer. When a group sound is detected, the GSNS 150 identifies the type of group sound and transmits a group sound detection identifier (GSDI) to the server 140. For example, the computer 102 transmits the GSDI 142 to the server 140 and the computer 110 transmits the GSDI 144 to the server 140. The groups sounds detected at each computer may be the same or different and these differences result in different identifiers being transmitted to the server 140.

The server 140 receives all the GSDI that have been transmitted to it from the computers in the network conference. The GSCS 160 totals the number of GSDIs received that identify each type of group sound. For example, ten client computers may detect clapping and three client computers may detect cheering.

When the total GSDIs received within a selected time interval (e.g., 0.5 to 1.0 seconds) for a particular group sound exceed a threshold value, then the GSCS 160 transmits a group sound control indicator GSCI (e.g., GSCI 146) to all the conference attendees. The group sound control indicator identifies one or more group sounds to be reproduced by the attendees' computers. For example, the GSCS 160 determines that the total number of GSDIs received for a clapping sound exceeds a threshold value. The GSCS 160 then transmits the GSCI 146 to all the attendees. The GSCI 146 identifies a group clapping sound to be reproduced by the computers of the attendees.

At the attendees' computers, the GSNS 150 receives the GSCI 146 and obtains group sound information or a group sound file from a group sound database. It should be noted that the GSCI 146 can identify more than one group sound to be reproduced at a time. For example the GSCI 146 can identify "clapping" as a group sound and can also identify "cheering" as a group sound. In another embodiment, the server 140 can transmit two GSCI to the attendees. One that identifies clapping and a second that identifies cheering. As a result, when a selected number of attendees are detected making a group sound, the GSCS 140 sends out one or more group sound control indicators so that all attendees reproduce a group sound that is more representative of the number of attendees. This provides a more realistic group sound experience for the attendees of the network conference.

Figure 2:
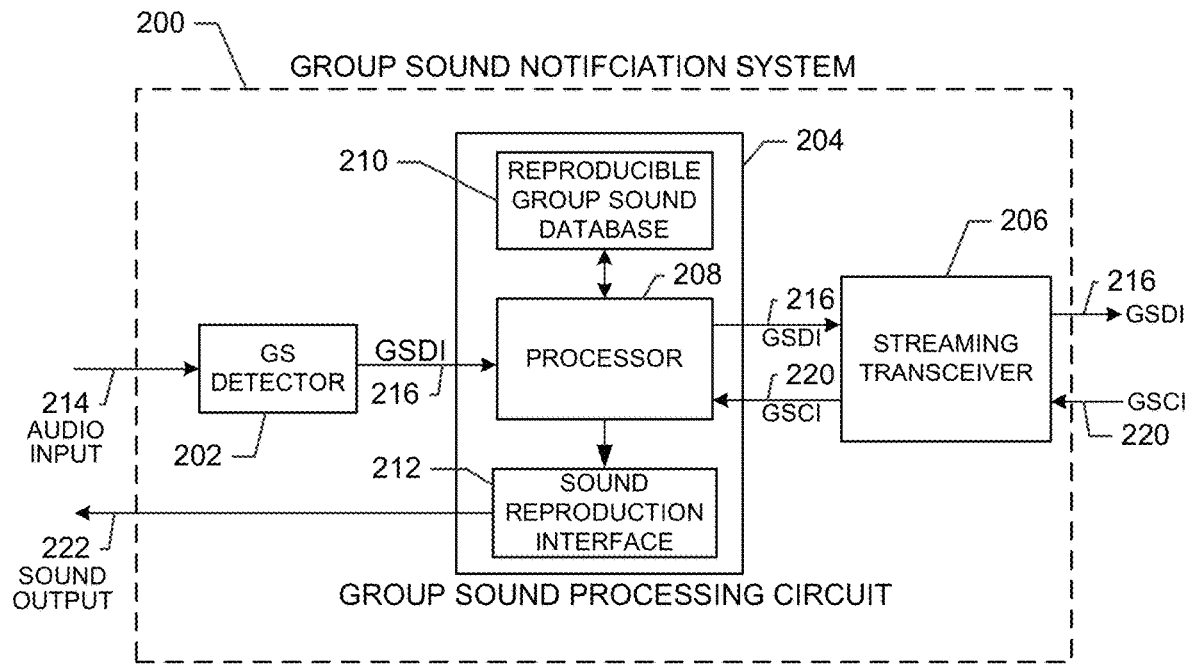
FIG. 2 shows an exemplary embodiment of a group sound notification system shown in FIG. 1.

FIG. 2 shows an exemplary embodiment of a group sound notification system (GSNS) 200. For example, the GSNS 200 is suitable for use as the GSNS 150 shown in FIG. 1. The GSNS 200 comprises group sound detector 202, group sound processing circuit 204, and streaming transceiver 206. The circuit 204 comprises processor 208, reproducible group sound database 210, and sound reproduction interface 212.

During operation, an audio input 214 is received by the group sound detector 202. For example, the audio input can be an audio signal of a user that is generated by a microphone. The audio input 214 may include one or more group sounds that are also captured by the microphone. For example, the group sounds captured by the microphone may be clapping or cheering, or other type of group sound.

In an embodiment, the audio input 214 is input to the group sound detector 202, which detects the presence of group sounds in the audio input. If the audio input comprises group sounds, the GS detector 202 generates and outputs a group sound detection identifier (GSDI) 216 that identifies the group sounds detected in the audio input 214.

In an embodiment, the processor 208 passes the received GSDI 216 to the streaming transceiver 206 for transmission to the network server. Thus, any GSDIs received by the processor 208 are transmitted to the network server (e.g., server 140).

In an embodiment, the network server determines when the number of attendee computers that detect a particular group sound within a selected time interval has exceeded a threshold value. For example, ten attendee computers report detecting clapping within a one second time interval and the threshold for clapping is eight computers. In this case, the server generates and transmits a group sound control indicator 220 to all the UE of the network conference. The GSCI 220 is received by the streaming transceiver 206 input to the processor 208. The GSCI identifies one or more group sounds to be reproduced by the attendee's computer. The processor 208 retrieves one or more reproducible group sounds from the database 210 based on the received GSCI 222. For example, the group sounds are stored in the database 210 as sound files or other type of sound information that can be audibly reproduced. In an embodiment, the group sounds in the database 210 are pre-stored or downloaded from the network server.

The processor 208 then passes the reproducible group sounds to the sound reproduction interface 212 for reproduction by the attendee's computer. Thus, instead of attendees hearing clapping or cheering from a few meeting participants, the system provides a more realistic conference experience by reproducing group sounds made by hundreds or thousands of people.

In an exemplary embodiment, the group sound notification system operates within the group sound enhancement system to provide enhanced group sounds for real-time networked conferencing by performing at least one or more of the following operations.

1. Obtain an audio signal at UE. For example, the audio signal can be obtained from a microphone.

2. Detect when the audio signal comprises group sounds, such as clapping or cheering. For example, the group sound detector 202 makes this determination and outputs the group sound detection indicator 216, which indicates the types of group sounds that are detected.

3. Transmitting the GSDI to a network server. For example, processor 208 uses the streaming transceiver 206 to transmit the GSDI 216 to a network server (such as server 140).

4. Receive a group sound control indicator from the network server. For example, the GSCI 220 is received from the network server 140 by the transceiver 206 and passed to the processor 208. The GSCI indicates that the number of attendee computers that are detected a selected group sound has exceeded a threshold value.

5. Retrieve reproducible group sound information from a reproducible group sound database based on the information in the GSCI. For example, the processor 208 accesses the database 210 based on the GSCI 220 and to obtain the group sound information.

6. The retrieved group sound information is reproduced at the user equipment. For example the processor 208 retrieves the group sound information from the database 210 and passes this information to the sound reproduction interface 212. Sound reproduction interface 212 produces the sound output 222. The sound output 222 comprises one or more group sounds, such as clapping or cheering that emanate from a large number of participants to provide a more realistic group experience.

Figure 3:
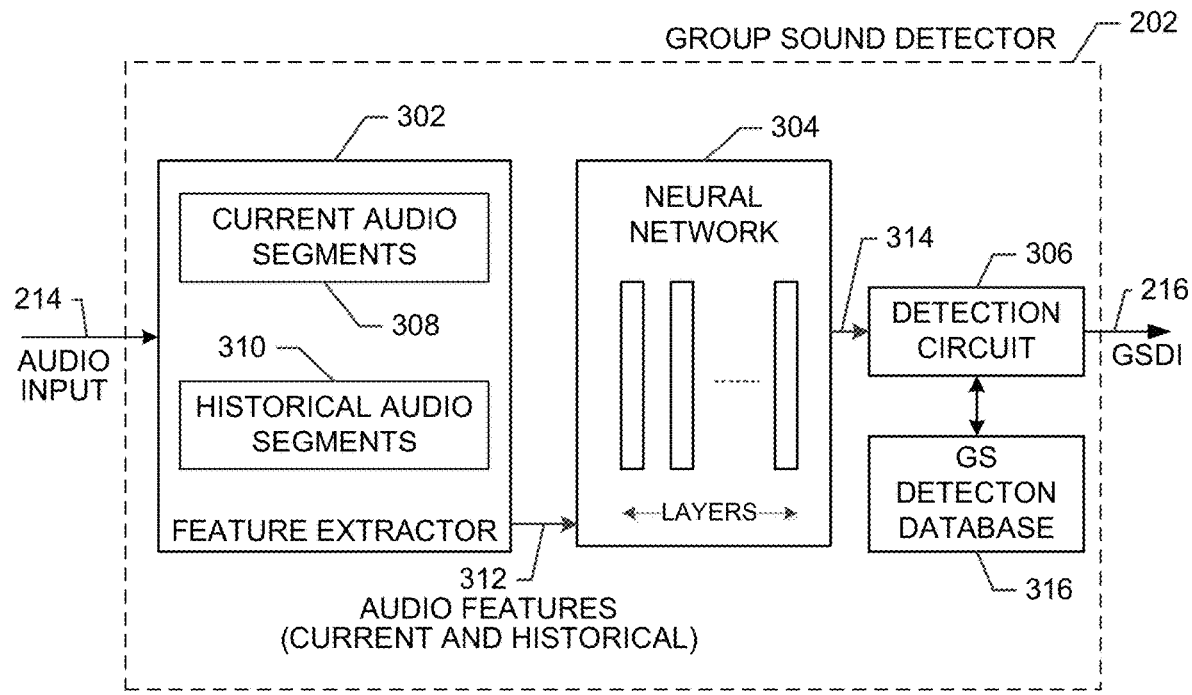
FIG. 3 shows an exemplary detailed embodiment of a group sound detector shown in FIG. 2.

FIG. 3 shows an exemplary detailed embodiment of the group sound detector 202 illustrated in FIG. 2. In an embodiment, the group sound detector 202 comprises a feature extractor 302, neural network 304, detection circuit 306, and group sound detection database 316.

In an exemplary embodiment, the group sound detector 202 is configured to analyze the audio input 214 to determine audio features 312 from short (usually 500 milliseconds) audio segments (current audio segments 308) and historical audio segments 310. The feature analysis is performed by an artificial intelligence (AI) based neural network 304 comprising one or multiple neural network layers, such as Fully Connected layers, Convolutional layers, and/or Long short-term memory layers. In an embodiment, the neural network 304 is trained to perform the functions described herein.

In an exemplary embodiment, the audio signal 214 is input to the feature extractor 302, which extracts audio features 312 (for example, Mel Frequency Cepstral Coefficients (MFCCs)) from the current audio segment 308 and the historical audio segment 310. The audio features 312 (current and historical) are then input to the neural network 304.

In an exemplary embodiment, the neural network 304 processes the features 312 and outputs a probability indicator 314 that indicates the probability of the current audio segment 308 containing group sounds expressed in a 0-1 scale for each sound type. In an embodiment, the detection circuit 306 receives the probability indicator 314 and performs post processing strategies to remove outliers and to further map the probability indicator 314 to binary values in the group sound detection indicator 216. The binary values indicate whether or not a particular group sound type is present. The GSDI 216 is then output to the processor 208 of the group sound processing circuit 204.

Figure 4:
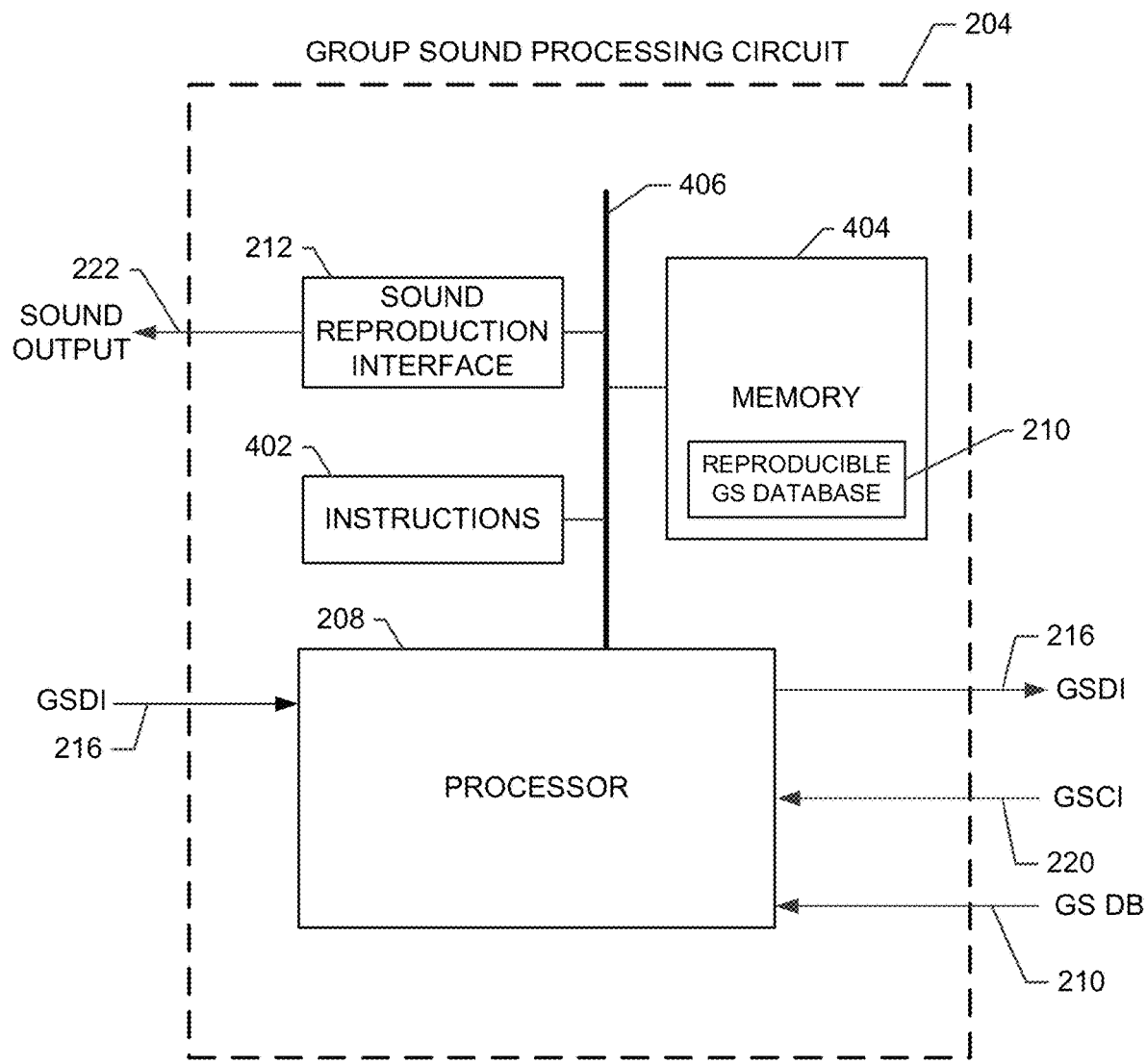
FIG. 4 shows an exemplary detailed embodiment of a group sound processing circuit for use at user equipment shown in FIG. 2.

FIG. 4 shows an exemplary detailed embodiment of the group sound processing circuit 204 for use at user equipment as illustrated in FIG. 2. In an embodiment, the circuit 204 comprises the processor 208, instructions 402, memory 404, and the sound reproduction interface 212 all coupled to communicate over bus 416. The memory 404 includes the reproducible GS database 210.

During operation, the network server transmits the reproducible GS database 210 to the circuit 204 for storage in the memory 404. The processor receives the GSDI 216 and outputs this indicator to the transceiver 206 for transmission to the network server. The GSDI 216 indicates the group sounds detected at the user equipment by the GS detector 202.

The network server transmits the GSCI 220 over the network to the processor 208. The GSCI 220 indicates the types of reproducible sounds that are to be reproduced at the user equipment. In another embodiment, the GSCI 220 is received from another entity, such as user equipment acting as a meeting host. The processor 208 analyzes the GSCI 220 and determines the sounds to be retrieved from the reproducible GS database 210. The processor retrieves the sounds and/or sound files from the reproducible GS database 210, and passes this information to the sound reproduction interface 212. The sound reproduction interface 212 produces a sound output 222 that is used to reproduce the identified group sounds at the user equipment.

Figure 5:
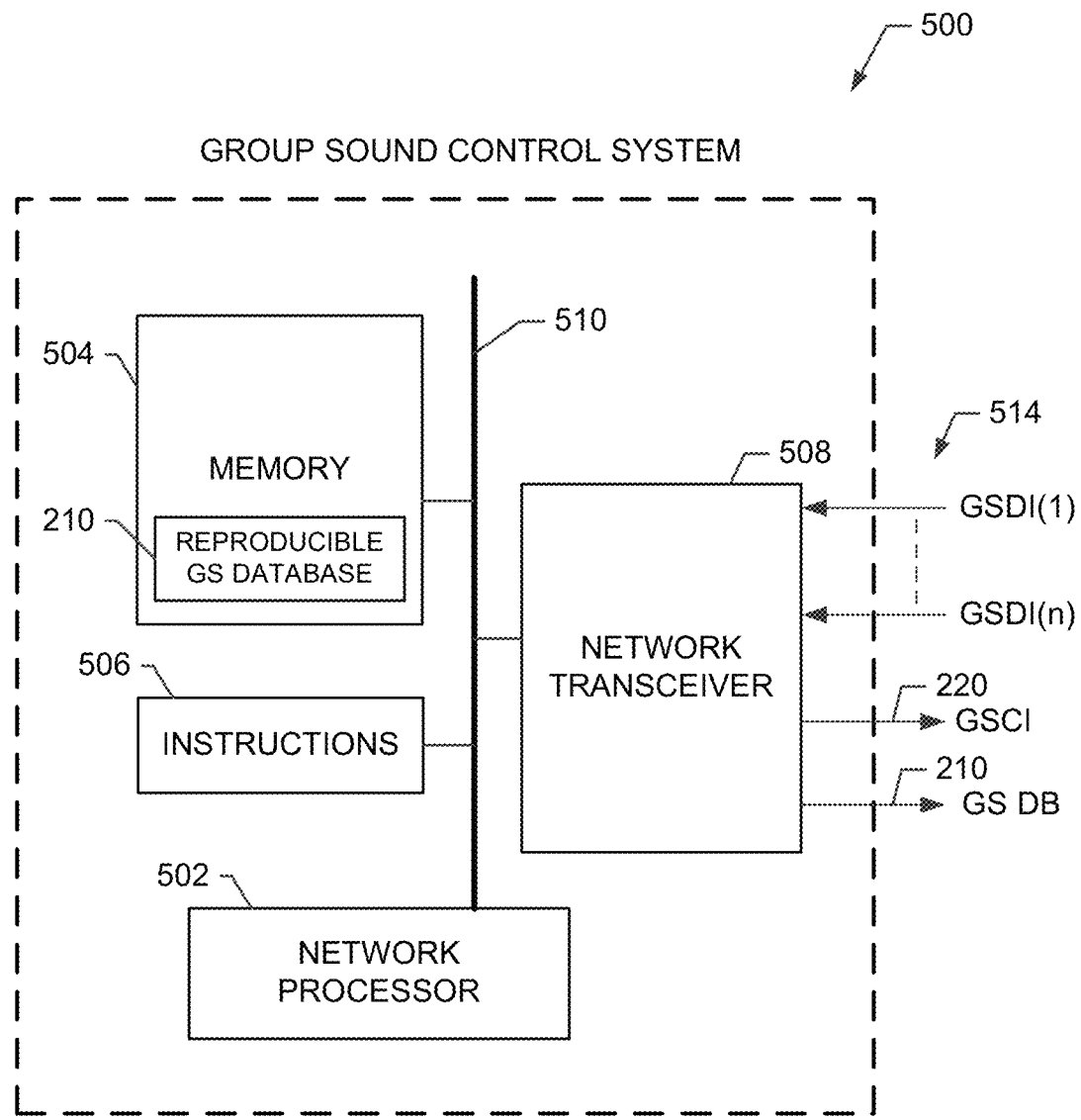
FIG. 5 shows an exemplary detailed embodiment of a group sound control system shown in FIG. 1.

FIG. 5 shows an exemplary detailed embodiment of the group sound control system 500 for use at a network server. For example, the group sound control system 500 is suitable for use as the group sound control system 160 illustrated in FIG. 1. In an embodiment, the system 500 comprises network processor 502, memory 504, instructions 506, and network transceiver 508 all coupled to the bus 510. The memory 504 comprises the reproducible group sound database 210.

During operation, the processor 502 retrieves the reproducible GS database 210 from the memory 504 and transmits this database to all UE of a network conference. For example, the processor 502 passes the database 210 to the transceiver 508, which transmits the database 210 to the networked UE as indicated.

A plurality of GSDI 514 are received by the network transceiver 508 from networked UE and indicate the group sounds detected at each UE. The GSDI 514 are passed to the processor 502, which totals the number of UE that have detected each type of group sound within a selected time interval. For example, the time interval in the range of 0.5 to 1 second, but any desired time interval can be utilized. If the total for any group sound exceeds a selected threshold, then the processor 502 generates the GSCI 220, which is transmitted to the networked UE. The GSCI 220 indicates to the UE which group sounds are to be reproduced at the UE. For example, if the plurality of GSDI 514 indicate that the number of UE detecting a clapping group sound exceed a threshold value, the processor 502 generates the GSCI 220 to control the UE to reproduce the group clapping sound stored in the GS database 210. Exemplary embodiments of the indicators GSDI and GSCI are provided below.

In an exemplary embodiment, a group sound control system operates within the group sound enhancement system to provide enhanced group sounds for real-time networked conferencing by performing at least one or more of the following operations.

1. Download a reproducible group sound database to client UE.
2. Receive one or more GSDI from UE that detect a group sound.
3. Total the number of UE that detect a particular group sound within a selected time interval.
4. When the number of UE that detect a particular group sound exceed a threshold, then generate a GSCI that identifies that group sound to be reproduced at the UE.
5. Transmit the GSCI to the UE of the network conference.

FIG. 6 shows an exemplary embodiments of the indicators GSDI and GSCI for use with embodiments of a group sound enhancement system. The first table 602 shows values for the indicator GSDI for use with the group sound notification system. For example, the group sound detection database 316 identifies group sounds and their associated GSDI 604. In an embodiment, each bit position of the GSDI 604 identifies a corresponding detected group sound. Thus, the GSDI 604 identifies one or more detected group sounds 606 by having the appropriate bit positions set to "1."

The second table 608 shown in FIG. 6 shows values for the indicator GSCI 610 for use with the group sound notification system. For example, the reproducible group sound database 210 identifies group sounds and their associated GSCI 610. In an embodiment, each bit position of the GSCI 610 identifies a corresponding reproducible group sound 612. Thus, the identifier 610 identifies one or more reproducible group sounds 612 by having the appropriate bit positions set to "1."

Figure 7:
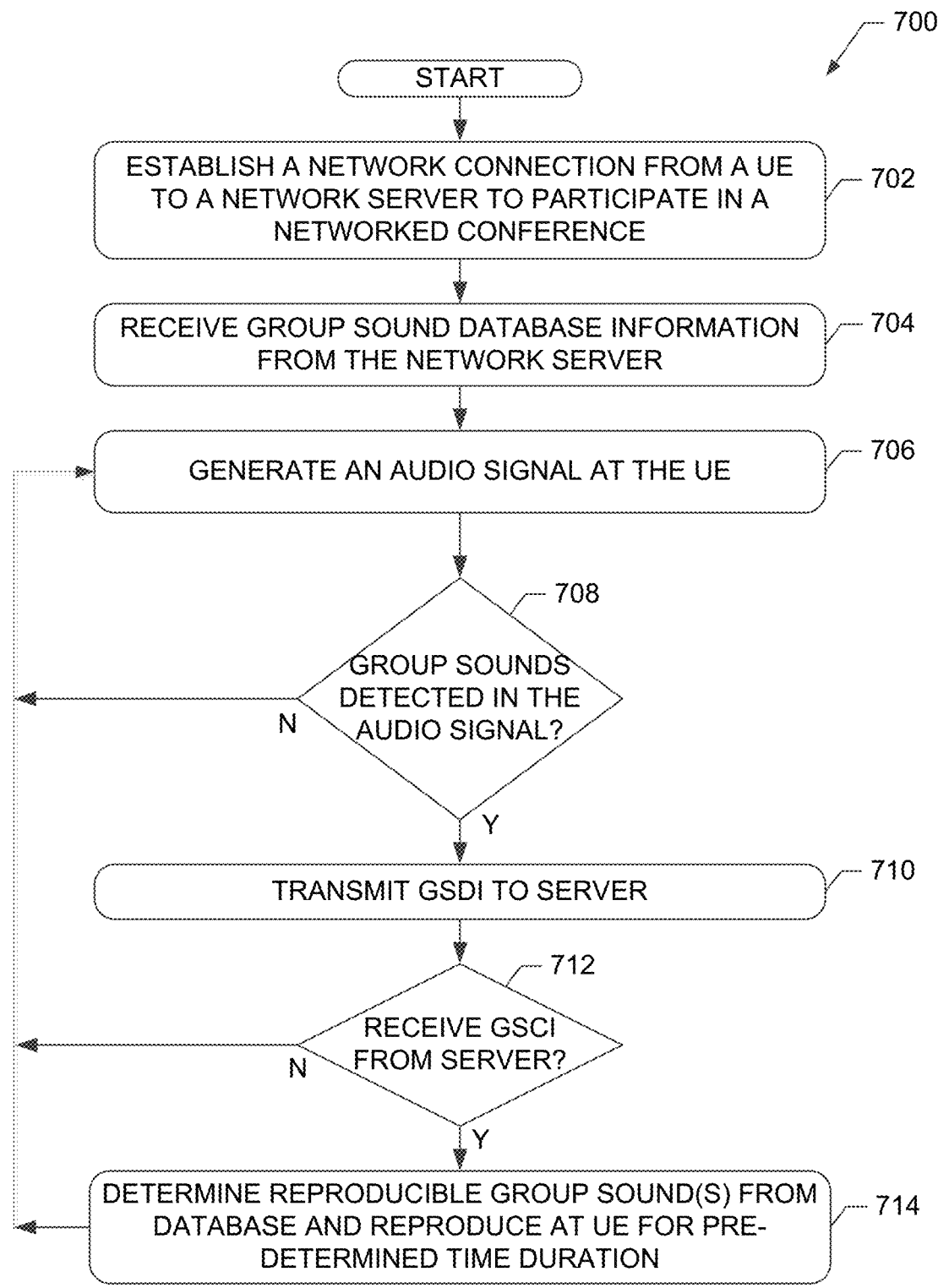
FIG. 7 shows an exemplary method for operating user equipment to provide group sound enhancement during a network conference.

FIG. 7 shows an exemplary method 700 for operating user equipment to provide group sound enhancement during a network conference. For example, the method 700 is suitable for use to operate the group sound notification systems 150 of the computers 102, 110, 118, 120 shown in FIG. 1. The method 700 is also suitable for use with the GSNS 200 shown in FIG. 2.

At block 702, a network connection for facilitating a real-time audio/video network conference with enhanced group sound is established between a plurality of UE and a network server. For example, multiple computers and/or portable devices situated in different geographical locations (i.e., computer 102, 110, 118, 120) are linked to the server 140 via the communications network 130 for a real-time interactive network conference as illustrated in FIG. 1. Each computer includes a group sound notification system 150.

At block 704, a reproducible group sound database is received from the network server at the plurality of UE. For example, each UE receives and stores the reproducible group sound database 210 as part of the group sound notification system 200 as shown in FIG. 2.

At block 706, an audio signal is generated at one or more UE. For example, the audio signal is produced by a microphone. In an embodiment, the microphone at a selected UE captures a user voice signal. In an embodiment, the captured audio signal forms the audio input 214 that is input to the group sound notification system 200.

At block 708, a determination is made as to whether one or more group sounds are detected in the audio signal. For example, the group sound detector 202 operates to detect whether any of the group sounds in the group sound detection database 306 are present in the audio signal. For example, the group sound detection databases 306 identifies group sounds such as clapping or cheering. If none of the identified sounds in the group sound detection database are detected in the audio signal, a group sound detection indicator (GSDI) 216 is set to all zeros and the method proceeds to block 706. If one or more of the identified sounds in the group sound detection database 306 are detected in the audio signal, the group sound detection indicator (GSDI) 216 is set to have corresponding bit positions set to "1" and the method proceeds to block 710. For example, each bit position of the GSDI 216 corresponds to a detected group sound. As illustrated in the GSDI shown in FIG. 6, a first bit position represents detected applause or clapping, a second bit position represents detected laughter, and so forth for other bit positions.

At block 710, the GSDI is transmitted to the network server. For example, the processor 208 receives the GDSI from the detector 202 and transmits the GDSI to the network server 140 using the stream transceiver 206.

At block 712, a determination is made as to whether a GSCI is received from the network server. For example, the stream transceiver 206 receives the GSCI from the network server 140. In an embodiment, the network server 140 transmits the GSCI within a pre-determined time interval after the GDSI is transmitted. In another embodiment, the GSCI is received from a node other than a network server. For example, the GSCI is received from user equipment acting as a meeting host. The processor 208 waits for the time interval to expire. If a GSCI is not received by the end of the pre-determined time interval, the method proceeds to block 706. If a GSCI is received before the end of the pre-determined time interval, the method proceeds to block 714.

At block 714, one or more reproducible group sounds are determined from the received GSCI. For example, the processor 208, uses the received GSCI to access the reproducible group sound database 210 to determine which group sounds are to be reproduced at the user equipment. For example, as illustrated by the GSCI shown in FIG. 6, each bit of the GSCI identifies a reproducible group sound. The processor 208 determines the reproducible group sounds identified in the GSCI and reproduces those sounds are the UE. For example, a sound file corresponding to each reproducible group sound is included in the database 210. The processor 208 retrieves this sound file and reproduces the identified group sound using the sound reproduction interface 212. It should be noted that one or more group sounds can be identified in the received GSCI and that the processor 208 obtains the sound information to reproduce the one or more sounds at the UE.

Thus, the method 700 provides a method for operating user equipment to provide group sound enhancement during a network conference. It should be noted that the operations of the method 700 are exemplary and not limiting of the scope of the embodiments. Furthermore the operations of the method 700 can be changed, deleted, rearranges, added to, or otherwise modified within the scope of the embodiments.

Figure 8:
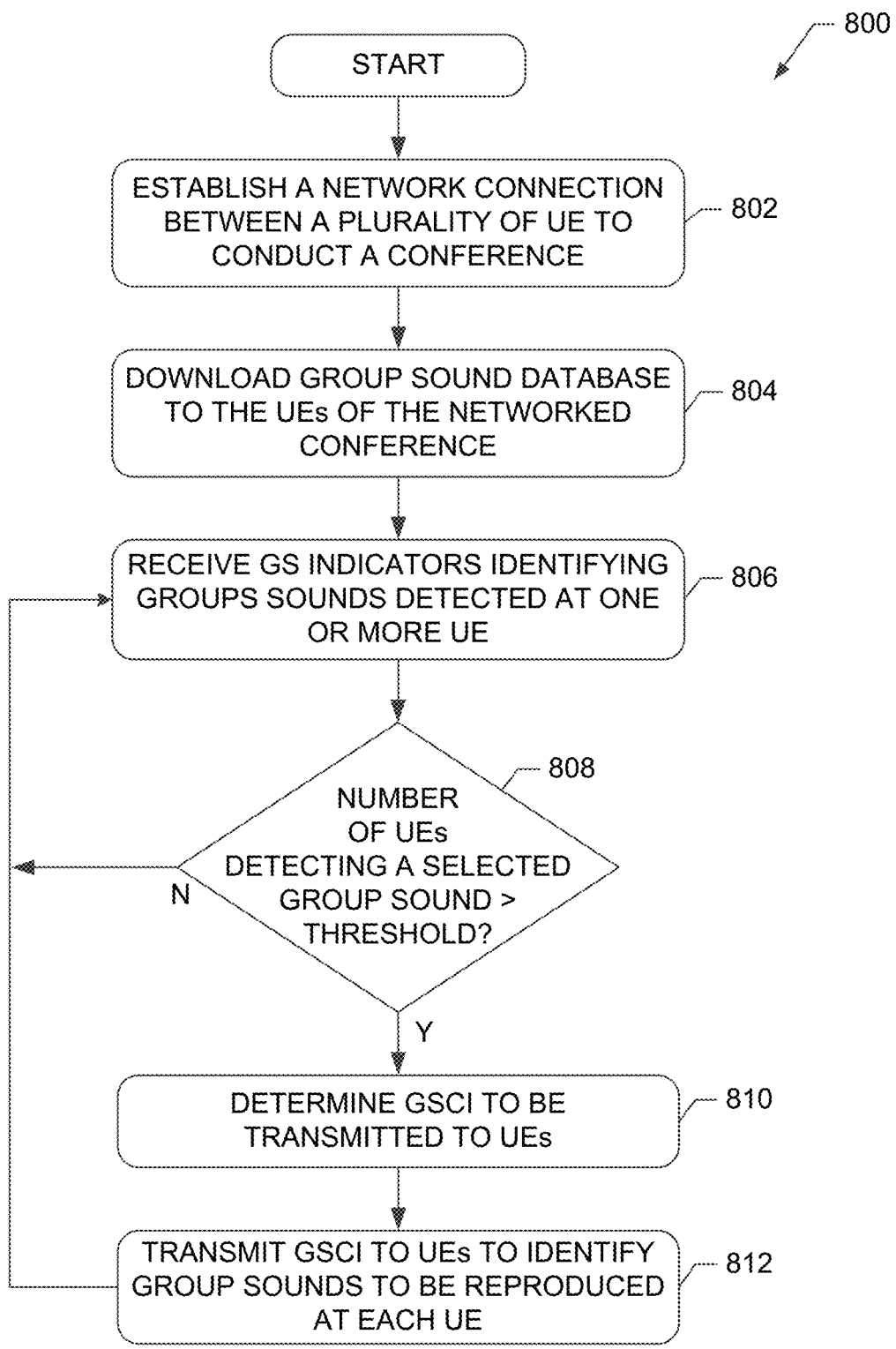
FIG. 8 shows an exemplary method for operating a server to provide group sound enhancement during a network conference.

FIG. 8 shows an exemplary method 800 for operating a server to provide group sound enhancement during a network conference. For example, the method 800 is suitable for use to operate the group sound control system 160 shown in FIG. 1. The method 800 is also suitable for use with the GSCS 500 shown in FIG. 5.

At block 802, a network connection for facilitating a real-time audio/video network conference with enhanced group sound is established between a plurality of UE and a network server. For example, multiple computers and/or portable devices situated in different geographical locations (i.e., computer 102, 110, 118, 120) are linked to the server 140 via the communications network 130 for a real-time interactive network conference as illustrated in FIG. 1. Each computer includes a group sound notification system 150 and the server 140 includes the group sound control system 500.

At block 804, a reproducible group sound database is transmitted from the network server to the plurality of UE. For example, the processor 502 transmits the reproducible group sound database 210 to all UE using the transceiver 508. Each UE receives and stores the reproducible group sound database 210 as part of the group sound notification system 200 as shown in FIG. 2.

At block 806, one or more GSDI are received. For example, the network transceiver 508 of the group sound control system 500 receives the plurality of GSDI(1-n) 514 from the UE of the network conference. The GSDI(1-n) 514 identify the types of groups sounds that are detected at each UE.

At block 808, a determination is made as to whether the number of UEs detecting a particular group sound within a selected time interval exceeds a selected threshold. In an embodiment, the processor 502 totals the number of UEs reporting detection of each sound type within a selected time interval, such as within a one second time interval. For example, the processor 502 totals the number of UEs that detect clapping and/or cheering based on the received GSDIs. If the number of UEs that detect any particular group sound does not exceed a threshold, the method proceeds to block 806. If the number of UEs that detect any particular group sound does exceed a threshold, the method proceeds to block 810.

At block 810, GSCI to be transmitted to the UE are determined. For example, the processor 502 determines which sounds are to be reproduced at the UEs. For example, based on the group sounds for which the threshold has been exceeded, the processor generates the GSCI to have the appropriate bit locations set to a value of "1" so that the desired group sounds will be reproduced at the UE.

At block 812, the generated GSCI is transmitted to the UE. For example, in an embodiment, the transceiver 508 transmits the GSCI 220 to all UE. In another embodiment, the transceiver 508 transmits the GSCI 220 individually to each UE.

Thus, the method 800 provides a method for operating a group sound control system during a network conference. It should be noted that the operations of the method 800 are exemplary and not limiting of the scope of the embodiments. Furthermore the operations of the method 800 can be changed, deleted, rearranges, added to, or otherwise modified within the scope of the embodiments.

In an embodiment, the group sound enhancement system may implement the functions described herein using customized hard-wired logic, one or more ASICs or FPGAs, firmware and/or program logic which in combination with a computer system causes or programs a device to provide the GSES as a special-purpose machine. According to one embodiment, the techniques herein are performed by the GSES in response to processors 208, 502 executing one or more sequences of one or more instructions 402, 506, respectively. Such instructions may be read into a memory from another storage medium. Execution of the sequences of instructions causes the processors to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks. Volatile media includes dynamic memory, such as main memory. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise buses 406 and 510. Transmission media can also take the form of acoustic or light waves, such as those generated during radio-wave and infra-red data communications.

Various forms of media may be involved in carrying one or more sequences of one or more instructions to a processor for execution. For example, the instructions may initially be carried on a magnetic disk or a solid-state drive of a remote computer. The remote computer can load the instructions into its dynamic memory and send the instructions over a telephone line using a modem. A local modem can receive the data on the telephone line and use an infra-red transmitter to convert the data to an infra-red signal. An infra-red detector can receive the data carried in the infra-red signal and appropriate circuitry can place the data on buses 406 and 510. The buses carries the data to memory, from which a processor retrieves and executes the instructions. The instructions received by memory may optionally be stored on a storage device either before or after execution by the processor.

The exemplary embodiment of the present invention includes various processing steps described herein. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from the exemplary embodiments of the present invention and its broader aspects. Therefore, the appended claims are intended to encompass within their scope all such changes and modifications as are within the true spirit and scope of these exemplary embodiments of the present invention.

What is claimed is:

1. A method for group sound enhancement in a network conference, the method comprising:

receiving, by one or more user equipment (UEs) and an additional user equipment (additional UE), a reproducible group sound information from a network server;

storing, by one or more of the UEs, the reproducible group sound information;

storing, by the additional UE, the reproducible group sound information;

generating a respective audio signal at one or more of the UEs accessing a networked conference meeting, the networked conference meeting further currently accessed by the additional UE;

detecting, by one or more of the UEs, a group sound in the audio signal resulting from processing one or more current audio segments and one or more historical audio segments of the audio signal to determine one or more audio features;

generating, by one or more of the UEs, a group sound indicator that identifies the detected group sound;

transmitting, by one or more of the UEs, the group sound indicator to a network server;

receiving from the network server, at the additional UE, a control signal that identifies a selected group sound, the control signal determined by the network server due to a designated UE number threshold being exceeded by a total number of the UEs transmitting a respective instance of the group sound indicator within a selected time interval; and retrieving, by the additional UE, the selected group sound from the stored reproducible group sound information;

reproducing, at the additional UE, the selected group sound indicated by the control signal.

2. The method of claim 1, wherein the generating the audio signal comprises receiving the audio signal from a microphone.

3. The method of claim 1, wherein the detecting the group sound comprises detecting at least one of a clapping group sound and a cheering group sound.

4. The method of claim 1, wherein the detecting comprises:
processing the audio features to identify group sound content in the audio signal; and
generating the group sound indicator associated with the identified group sound content.

5. The method of claim 1, further comprising:
retrieving, by the additional UE, multiple group sounds from the stored reproducible group sound information based on the control signal; and
reproducing, by the additional UE, the multiple group sounds.

6. The method of claim 1, further comprising:
receiving the group sound indicator at the network server, the control signal generated at the network server and transmitted from the network server to the additional UE.

7. The method as in claim 1, wherein the additional UE comprises a respective UE concurrently accessing the networked conference meeting with the other one or more UEs that transmitted the group sound indicator to the network server.

8. The method as in claim 1, wherein reproducing at the additional UE comprises:
wherein the selected group sound associated with a selected clapping group sound associated with the group sound in the audio signal, the first UE comprising a respective UE from the one or more UEs that transmitted a clapping group sound indicator to the network server;
reproducing the selected clapping group sound by the first UE; and
reproducing the same selected clapping group sound by the additional UE, the additional UE missing from the one or more UEs that transmitted the clapping group sound indicator to the network server.

9. Apparatus for group sound enhancement in a network conference, the apparatus comprising:
a receiver, of one or more user equipment (UEs) and an additional user equipment (additional UE), that receives a reproducible group sound information from a network server;
a store, of one or more of the UEs and the additional UE, that respectively stores the reproducible group sound information;
a detector, at one or more of the UEs accessing a networked conference meeting, that detects a group sound in an audio signal, wherein the detector generates a group sound indicator that identifies the group sound as result from processing one or more current audio segments and one or more historical audio segments of the audio signal to determine one or more audio features, the networked conference meeting further currently accessed by the additional UE;
a transceiver, at one or more of the UEs, that transmits the group sound indicator to the network server;
a receiver, of the additional UE, that receives a control signal from the network server, wherein the control signal that identifies a selected group sound, the control signal further determined by the network server due to a designated UE number threshold being exceeded by a total number of the UEs transmitting a respective instance of the group sound indicator within a selected time interval; and
a processor, of the additional UE, that retrieves the selected group sound from the stored reproducible group sound information; and
wherein the processor further reproduces the selected group sound at the additional UE.

10. The apparatus of claim 9, wherein the detector receives the audio signal from a microphone; and
wherein the detected group sound is at least one of clapping and cheering.

11. The apparatus of claim 9, wherein the detector processes the audio features to detect group sound content, and generates a particular group sound indicator associated with the detected group sound content.

12. A non-transitory computer readable medium on which are stored program instructions that, when executed by a processor, cause the processor to perform the operations of:
receiving, by one or more user equipment (UEs) and an additional user equipment (additional UE), a reproducible group sound information from a network server;
storing, by one or more of the UEs, the reproducible group sound information;
storing, by the additional UE, the reproducible group sound information;
generating a respective audio signal at one or more of the UEs accessing a networked conference meeting, the networked conference meeting further currently accessed by the additional UE;
detecting, by one or more of the UEs, a group sound in the audio signal resulting from processing one or more current audio segments and one or more historical audio segments of the audio signal to determine one or more audio features;
generating, by; one or more of the UEs, a group sound indicator that identifies the detected group sound;
transmitting, by one or more of the UEs, the group sound indicator to a network server;
receiving from the network server, at the additional UE, a control signal that identifies a selected group sound, the control signal determined by the network server due to a designated UE number threshold being exceeded by a total number of the UEs transmitting a respective instance of the group sound indicator within a selected time interval; and
retrieving, by the additional UE, the selected group sound from the stored reproducible group sound information;
reproducing, at the additional UE, the selected group sound indicated by the control signal.

13. The non-transitory computer readable medium of claim 12, wherein the program instructions cause the processor to perform an operation of receiving the audio signal from a microphone.

14. The non-transitory computer readable medium of claim 12, wherein the program instructions cause the processor to perform an operation of detecting at least one of a clapping and cheering as the group sound.

* * * * *